Nov. 24, 1942.  H. C. FLINT  2,303,036
SEAT CONSTRUCTION
Filed Sept. 7, 1940   3 Sheets-Sheet 3
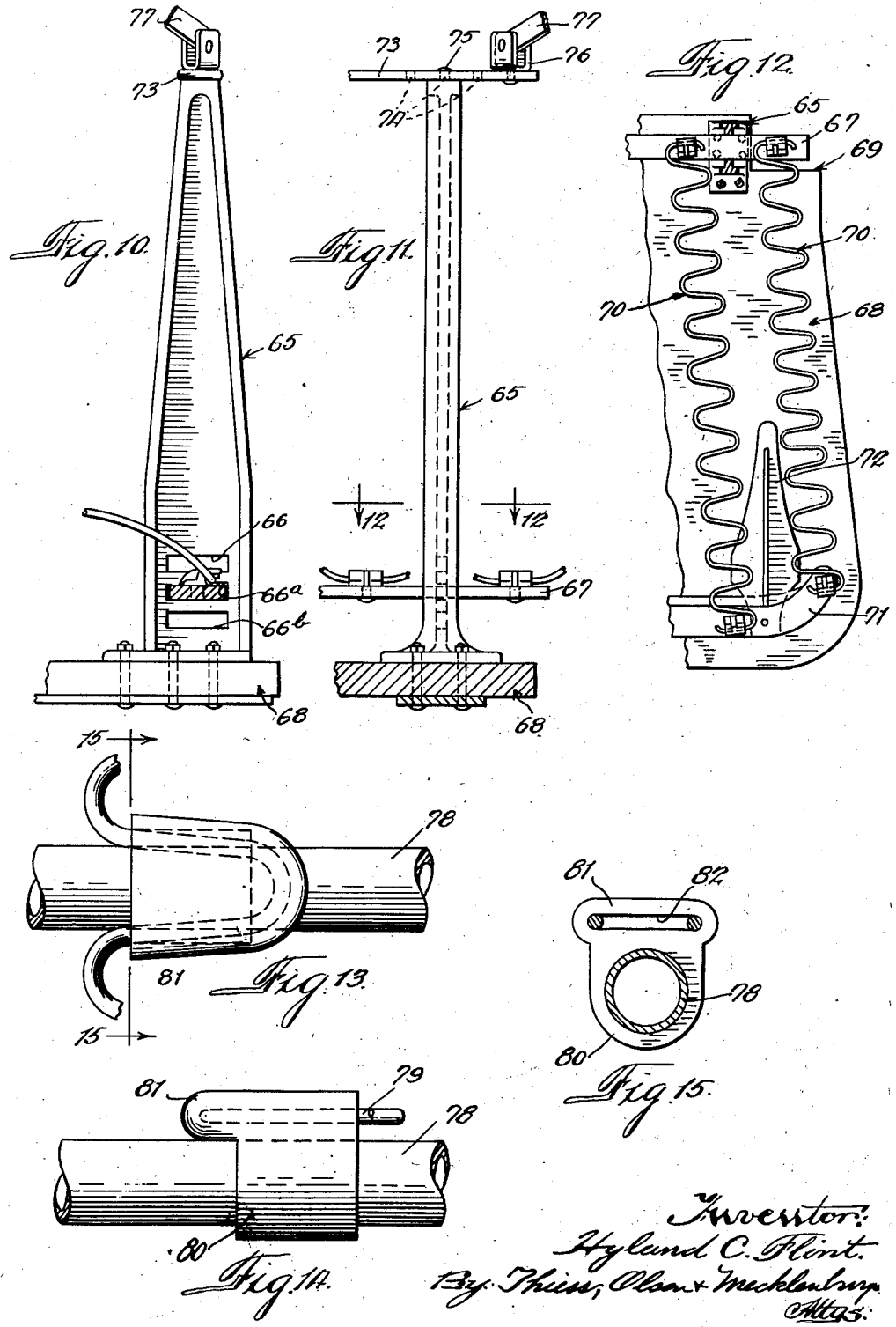
Inventor:
Hyland C. Flint.
By Thiess, Olson & Mecklenburg
Attys.

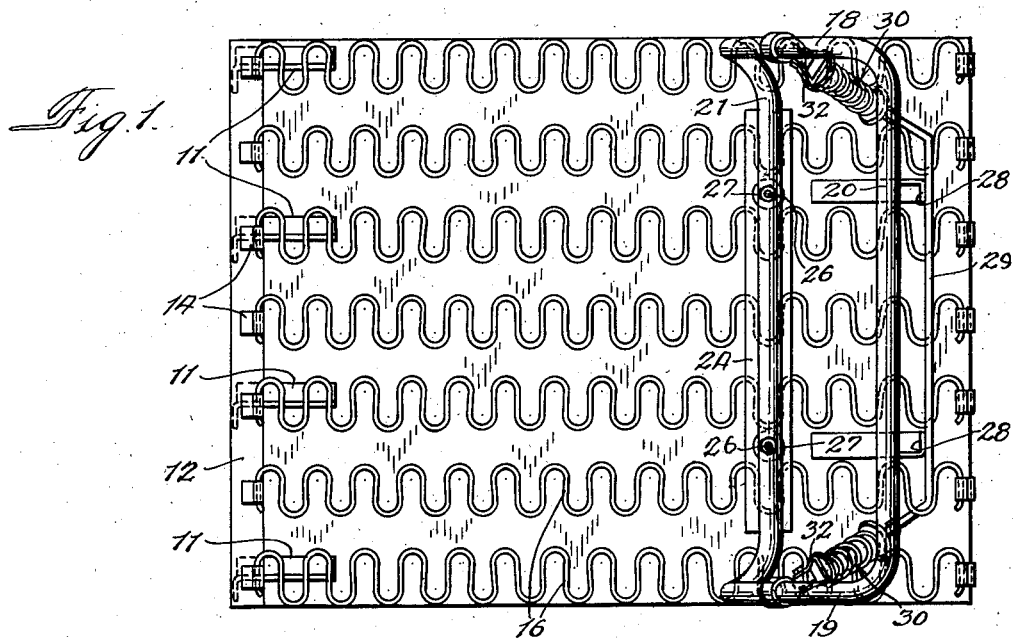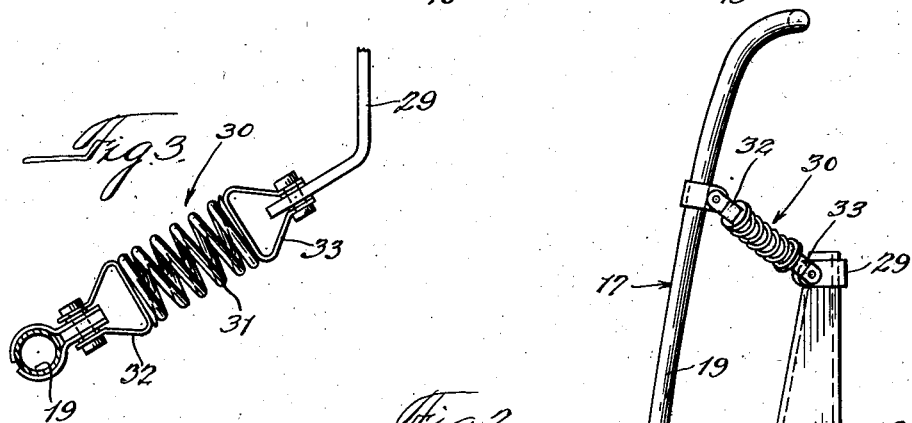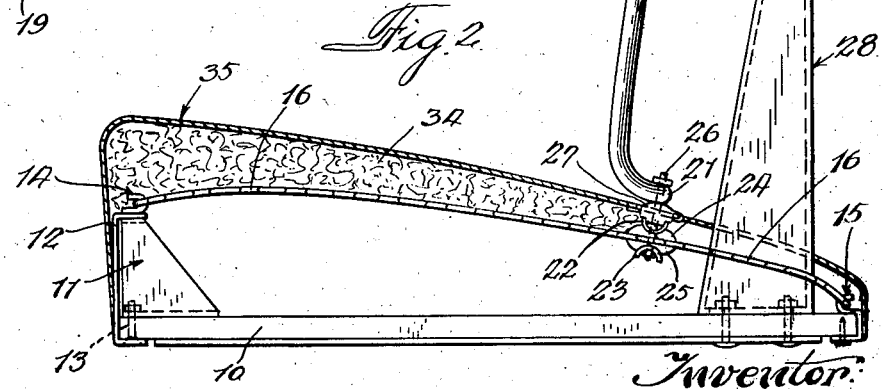

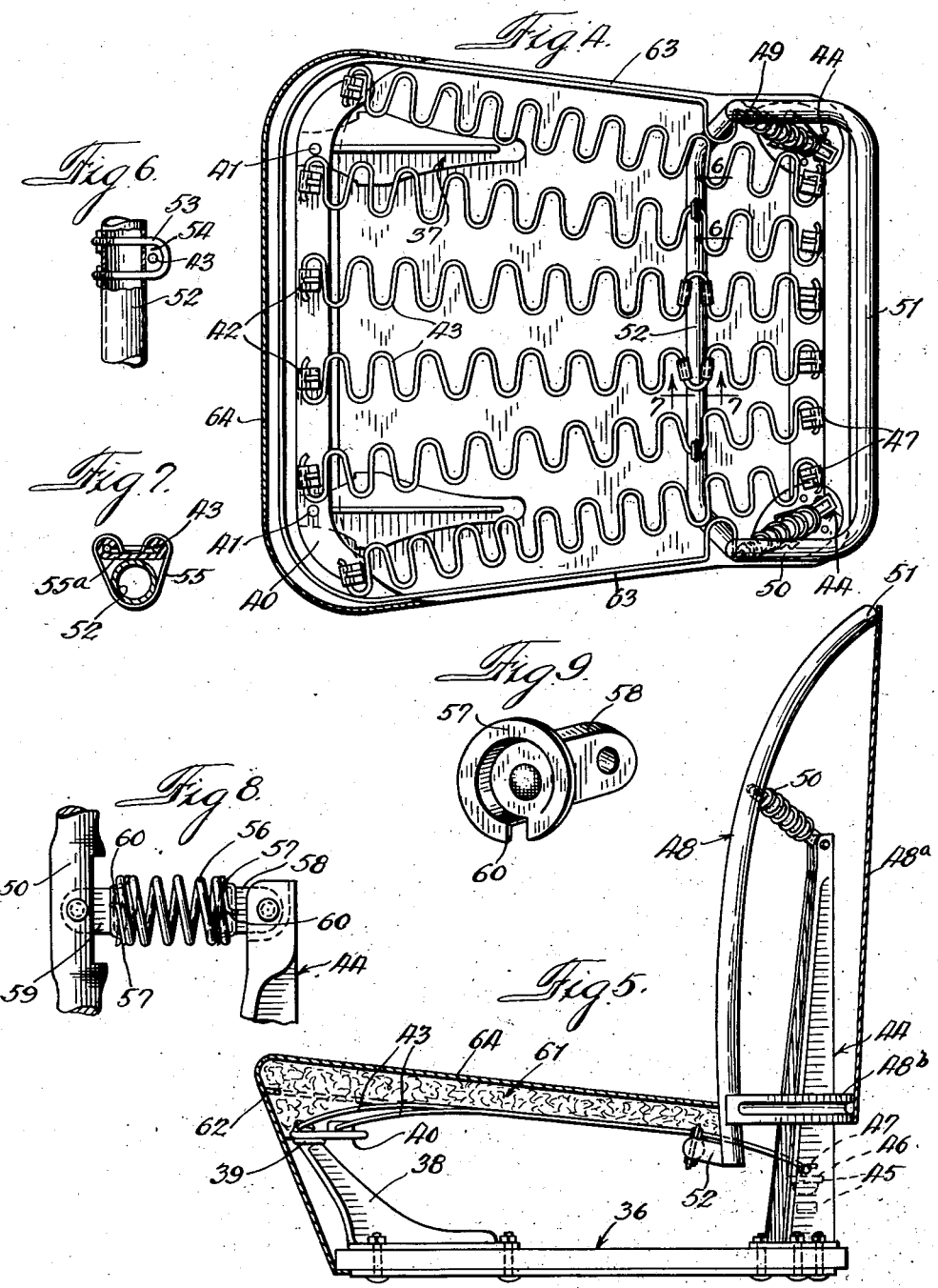

Patented Nov. 24, 1942

2,303,036

UNITED STATES PATENT OFFICE 2,303,036

SEAT CONSTRUCTION

Hyland C. Flint, Royal Oak, Mich., assignor to Patent Sales, Inc., Detroit, Mich., a corporation of Michigan Application September 7, 1940, Serial No. 355,763

18 Claims. (Cl. 155—53)

This invention relates to a seat construction and has special reference to a seat of the so-called unison type for use in chairs, davenports, vehicles or other similar constructions wherein it is desired to provide a synchronization of the substantially vertical movement of the back rest with the substantially horizontally extending seat in order to effect a somewhat floating support of the user.

More particularly, this invention relates to a seat construction comprising a rigid support and a plurality of yielding strips for resisting a vertically disposed weight extending substantially horizontally and having the ends thereof fixed to the rigid support, a substantially vertically extending back rest frame being supported by the yielding strips intermediate the ends thereof for vertical movement therewith. An upright is fixed to the rigid support and means are disposed between the upright and the back rest frame for resisting rearward movement of the back rest frame and for permitting vertical movement thereof with respect to the fixed support responsive to the movement of the yielding strips.

The construction of this invention is suitable for installation in new cars and is likewise suitable for replacement of seats in cars in present day use. In order to fit cars of various manufacturers and of the various body styles of each manufacturer which have changed more or less from year to year over a period of a substantial number of years, it is necessary to provide a seat assembly wherein the several component parts thereof may be readily adapted to varying widths, depths, and heights. These conditions are present both in adapting the seat for installation in a new car as well as in the replacement of a seat in a used car. The present invention, therefore, has for one of its primary objects the construction and arrangement of elements so as to afford a comparatively inexpensive assembly, standardization of parts, and flexibility to dimensional changes.

The means supported between the upright and the back rest frame for resisting rearward movement of the back rest frame and for permitting vertical movement thereof responsive to the movement of the yielding strips comprises a rocker spring assembly of a comparatively simplified form which is comparatively inexpensive to manufacture and to install, and is efficient in use. The pivotal arms of each assembly, one of which is mounted on the back rest frame and the other of which is mounted on the upright, are provided with spiral ramp flanges that are screwed into the end convolutions of a coil spring disposed therebetween. It is, therefore, also a primary object of this invention to provide a rocker spring assembly for permitting substantially universal movement of the back rest frame in a simple and efficient manner.

The back rest frame is connected to the yielding strips of the seat in order that the back rest will have positive vertical movement therewith. If the connection between the back rest frame and the yielding strips of the seat is too far back, it reaches the area near the dead end of the strips where there is no action or unison action is reduced to such an extent that the center of the strips of the seat moves vertically to a substantially greater extent than the back rest frame. It is, therefore, desirable to have the back rest connection with the yielding strips as far forward as practical and yet keep the back rest frame as far back as practical in order that a minimum of overall dimensions may be maintained.

The present construction directs a movement of the back rest frame to substantially the extent of movement of the center of the yielding strips and yet the back rest frame is disposed substantially at the rear of the seat. The back rest frame comprises side bars connected by at least one cross bar, the cross bar extending in a direction forwardly of the side bars and transversely below the yielding strips so as to afford a connection with the yielding strips on a line of substantially maximum movement, the side bars being disposed substantially at the rear of the yielding strips or adjacent the fixed ends thereof. The back rest frame may, therefore, be kept back as far as desirable and yet the connection thereof may be brought forwardly as far as is necessary.

The cross bar of the back rest frame is preferably disposed below the yielding strips and is connected thereto by clips which latter are cushioned so as to prevent wear and noises. Since the clips are of very small thickness there is relatively little bulk above the yielding strips and the person on the seat may actually sit directly over the cross bar without being aware of it.

A further feature of this invention is the provision of a trim frame for the outer edges of the seat. A resilient pad is preferably disposed on the top of the yielding strips, the pad having a peripheral groove for receiving the frame which preferably may be in the form of a wire. The frame restrains the edges of the pad from unduly collapsing when the trim or upholstery is disposed on the seat.

One of the objects of this invention is to provide a seat construction of the character indicated above which is comparatively inexpensive to assemble, is standardized as to parts, and is flexible as to dimensional changes.

Another object of this invention is to provide a seat construction of the above indicated type in which a rocker spring assembly is employed to resist universal movement of the back rest frame, the elements being simple to assemble, comparatively inexpensive to manufacture and to install, and is durable.

A still further object of this invention is to provide a seat construction of the character noted above wherein the connection between the back rest frame and the seat is disposed substantially forwardly of the back rest frame and beneath the yielding strips of the seat.

It is also an object of this invention to provide a seat construction of the hereinabove noted type wherein the connection between the metallic members is cushioned and the resilient pad for covering the yielding strips is provided with a peripheral reinforcement to prevent undue collapse of the edges of the pad.

Other objects and advantages of this invention will hereinafter be more particularly pointed out and, for a more complete understanding of the characteristic features of this invention, reference may now be had to the following description when taken together with the accompanying drawings, in which latter:

Figure 1 is a top plan view of a seat construction embodying the features of this invention, the resilient pad and trim being removed therefrom;

Fig. 2 is a side elevational view of Fig. 1 showing the resilient pad in position on the seat portion thereof and the trim in section;

Fig. 3 is an enlarged side elevational view of the rocker spring assembly showing it in position between the upright and the back rest frame which latter elements are shown fragmentarily;

Fig. 4 is a view similar to Fig. 1 of a modified form of construction;

Fig. 5 is a view similar to Fig. 2 of the construction shown in Fig. 4;

Fig. 6 is an enlarged sectional view taken on the line 6—6 of Fig. 4;

Fig. 7 is an enlarged sectional view taken on the line 7—7 of Fig. 4;

Fig. 8 is a side elevational view of the rocker spring assembly shown in Fig. 4, the assembly being disposed between the upright and the back rest frame which latter are shown fragmentarily;

Fig. 9 is an enlarged perspective view of one of the arm elements of the rocker spring assembly shown in Fig. 8;

Fig. 10 is an enlarged fragmentary side elevational view of a seat construction having a modified form of upright embodying the features of this invention;

Fig. 11 is a fragmentary front elevational view partially in section of Fig. 10;

Fig. 12 is a fragmentary plan sectional view taken on the line 12—12 of Fig. 11;

Fig. 13 is an enlarged fragmentary plan view of a portion of a seat construction employing a modified form of resilient connection;

Fig. 14 is a side elevational view of Fig. 13; and

Fig. 15 is a sectional view taken on the line 15—15 of Fig. 13.

Referring now to the drawings and more particularly to Figs. 1 to 3, inclusive, thereof, the seat construction of the present invention is illustrated in a form which is particularly adapted for use in automotive vehicles although the construction may be readily adapted for various other uses which will be apparent from a further consideration thereof.

A base 10 is provided for resting on a supporting surface, the base being substantially rectangular and being formed of wood or other easily cut or formed material in order that all sizes and shapes of bases may be secured at a minimum of tool cost. Mounted at the front edge of the base 10 is a plurality of rigid supports 11 for supporting a sheet metal channel 12, the sheet metal channel extending transversely across the base and having a lower horizontally extending arm thereof extending beneath the base. The rigid supports 11 are spaced as desired and are secured to the base by means of bolts 13 which latter may preferably be common to the arm of the channel below the base for holding the channel thereto.

The upper horizontally extending arm of the channel 12 forms a plate which extends transversely of the base at the forward end thereof, a plurality of spaced clips 14 being secured to the upper face of the arm. Complementary clips 15 are disposed on the rear of the base and may be of substantially S-shape with the lower portion of each of the S-shaped clips encompassing the rear edge of the base and the upper portion of each of the S-shaped clips forming a channel for receiving one end of one of the yielding strips 16. The other end of the yielding strip 16 is secured in one of the clips 14.

A yielding strip 16 extends between complementary sets of clips 14 and 15, the strips being spaced as desired. The yielding strips are for the purpose of resisting a vertically disposed weight on the seat and comprise preferably a wire of circular cross section having substantially horizontally extending undulations. The strips are normally upwardly arched with the ends of the wire being preferably permanently secured in the brackets 14 and 15 although, as shown in the drawings, it is not necessary to close the clips around the ends of the strips since they do not have any tendency to come out of the clips. In the fabrication of the strips a force is produced by the tendency of the strips to curl which is tremendously greater than that force which it resists when a weight rests on the strips. In actual practice the undulations prevent the lengthening of the strips which otherwise might be effected when a weight is deposited on an arched strip not having undulations.

In the manufacture of the yielding strips the wire undulations are given a permanent arcuate set of comparatively small radius, the forming being preferably done on a mandril. The strips are thereafter extended from the normal small radius to that of a larger radius to conform to the desired arch to be formed in the seat. Thus, when a weight is disposed on the yielding strips a further enlarging of the radius is obtained which is resisted by the normally smaller radius of set.

A substantially vertically extending back rest frame 17 is preferably formed of a substantially rectangular shape and comprises side bars 18 and 19 connected by cross bars 20 and 21. The width of the back rest is substantially the same as the width of the seat and is provided with usual cushioning means such, for example, as yielding strips, felt, hair, or rubber pads. The cross bar 21 is preferably connected directly to the yielding strips 16 of the seat, the connection comprising a pair of opposed bars 22 and 23 having rubber or other resilient inserts 24 and 25, respectively, disposed therebetween.

The opposed faces of the cross bars 22 and 23 are preferably of arcuate cross section and seat in the resilient rubber inserts 24 and 25, the inserts clampingly engaging the yielding strips 16 therebetween. A nut and bolt 26 holds the opposed bars 22 and 23 together with the inserts 24 and 25 to the cross bar 21, there being a resilient spacing collar 27 between the cross bar 21 and the bar 22. The bolt 26 passes through apertures in the opposed bars 22 and 23 and in the resilient inserts 24 and 25 for extension through an aperture in the spacing collar 27, and through apertures in the cross bar 21. The resilient spacing means permits angular flexibility of the back rest frame with respect to the seat and also cushions the connected members against shock and noise while the resilient inserts 24 and 25 prevent abrasion of the strips and the bars 22 and 23 and cushions the connected members against shock and noise.

The cross bars 22 and 23, together with their respective resilient inserts 24 and 25, preferably extend laterally to engage at least a major portion of the strips 16 leaving an end strip on each side to form a yieldable border and trim line at the seat. The back rest frame 17 has the cross bar 21 thereof offset with respect thereto in a direction rearwardly thereof to permit an arching of the padding thereof to fit the back of a user in a desired manner.

A pair of spaced uprights 28 is fixed to the base 10, each of the uprights preferably comprising a sheet metal tower of substantially channel shape. A flat bar 29 is fixed to the upper ends of the towers and extends transversely of the seat construction, the ends of the bar extending angularly from a point adjacent the connection thereof with the towers. Resilient means are disposed between the rigid uprights 28 and the back rest frame 17 for resisting rearward movement of the back rest frame and for permitting vertical movement with respect to the fixed support responsive to the movements of the yielding strips 16. The resilient means comprise a pair of rocker spring assemblies 30 shown more particularly in Fig. 3 of the drawings. A coil spring 31 is disposed between brackets 32 and 33, the brackets being, in turn, pivotally secured between the back rest frame and the bar 29. Disposed angularly in the relation shown between the uprights 28 and the side bars 18 and 19 of the back rest frame 17, the rocker spring assemblies resist side sway of the back rest frame.

A resilient pad 34 is disposed on the upper surfaces of the yielding strips 16, and the assembly of the pad, yielding strips and supports on the base 10 is covered in solid by trim or upholstery 35 except for the back and seat connection. The covering in this instance provides air binding to act as a cushion to slow down the vertical movement of the seat.

Referring now more particularly to Figs. 4 to 9, inclusive, of the drawings, a base 36 preferably formed of wood or other readily cut or formed material is provided of such contour as may be desired or required within the space provided for it in the vehicle. A pair of spaced castings 37 and 38 is mounted on the base 36 forming rigid supports. The bases of the castings 37 and 38 are bolted or otherwise secured to the base 36 in any desired position thereon, the upper end of each casting preferably extending forwardly beyond the confines of the base in order to provide support for an overhanging portion of the seat and to provide a gradually tapered trim.

Each of the castings 37 and 38 is provided with a rib for the reinforcement thereof, the rib extending from the base of the casting to a ledge 39, the ledges 39 supporting a flat metal plate 40 which extends transversely of the seat. A lug 41 extends upwardly from each ledge 39 to be received in suitable apertures in the flat metal plate 40. The apertures are placed in the plate 40 in a desired position with respect to the plate so as to shape the seat in any desired manner. The lugs 41 are slightly higher than the thickness of the plate 40 and may be riveted, burred, or tack-welded to the plate 40. In the provision of such a plate member the intermediate portion may extend straight or slightly curved in its transverse direction with one or both ends being curved to a substantially greater extent to accommodate various shape requirements and particularly to accommodate the sweep of seats with tapered sides.

A plurality of stamped or cast metal clips 42 are spaced as desired on the bar 40 and are secured to the bar in any suitable manner, the clips preferably having round lugs for insertion in similarly round holes in the plate to be fastened thereto in the same manner as the lugs 41. The clips 42 are provided with slots or grooves for receiving one end of the yielding strips 43, the strips forming the yielding surface of the seat.

An upright 44 is preferably disposed at the opposite end of the base 36 one at each corner in a spaced relation. Each of the uprights 44 are preferably formed of cast metal although, of course, it may be of wood or of metal stamping. The upper end of the upright 44 is bifurcated to form a seat for receiving one element of a rocker arm assembly which will hereinafter be more particularly described.

The uprights are each provided with a plurality of superposed bosses 45 extending inwardly in a direction toward each other to receive selectively thereon a flat metal plate 46 which extends transversely between the uprights. The plate 46 is thus adjustably secured to the uprights.

Clips 47 are mounted on the plate 46 in a spaced relation, there being one clip for each clip disposed on the plate 40 to receive the other end of the yielding strip 43. Complementary clips 42 and 47 on the plates 40 and 46, respectively, are so arranged as to permit the extension of the yielding strips in substantial fan shape or in any other desired manner. The yielding strips 43 are for the purpose of resisting a vertically disposed weight on the seat and are of the same type as that previously described with reference to the modification in Figs. 1 to 3 of the drawings.

A back rest frame 48 comprises preferably a pair of side bars 49 and 50 connected together by cross bars 51 and 52. The side bars and cross bars are preferably of tubular cross section although it will be understood that angle iron or other like rigid material may be substituted therefor. The cross bar 52 extends forwardly or in a direction away from the uprights 44 beneath the yielding strips 43 and transversely thereacross. The cross bar 52 is connected to the yielding strips 43 by clips of which two forms are shown for purposes of illustration. Referring first to the form of clip shown in Fig. 6, the clip comprises a U-shaped bolt 53, the intermediate portion of which forms a saddle for receiving a rubber or other resilient insert 54 surrounding one undulation of the yielding strip 43. The ends of the U-shaped bolt 53 extend through apertures in the cross bar 52 to receive suitable nuts. The yielding strip 43 is thus insulated from the connector and from the cross bar.

Another form of connector shown in Fig. 7 comprises a metal strip 55, an intermediate portion of which is bent to form a saddle for partially enveloping the cross bar 52, the ends thereof being hooked around a resilient insert 55a extending between and overlying opposed portions of the yielding strip 43. The saddle of Fig. 6 and the hooked end portions of the clip of Fig. 7 are of relatively small bulk above the yielding strip so that persons sitting on the seat will not be aware of the connectors.

By reason of the cross bar 52 extending substantially forwardly of the side bars 49 and 50 of the back rest frame, movement of the back rest frame in a vertical direction will be substantially the same as that of the yielding strips at the point of greatest vertical movement thereof. The back rest connection is supported by the yielding strip as far forward as may be desirable with the back rest frame being disposed as far rearward as may be practical.

Resilient means are disposed between the rigid upright and the back rest frame for resisting rearward movement of the back rest frame and for permitting vertical movement with respect to the fixed support 44 responsive to the movements of the yielding strips 43. Such resilient means is shown more particularly in Fig. 8 of the drawings and comprises a coil spring 56 having the first two or more convolutions at each end thereof close together providing threads in which are frictionally received spiral ramp flanges 57, the flanges being welded or otherwise fixedly secured to arms 58 and 59. The end of each spiral ramp flange is provided with a lip 60 which predetermines the extent to which the flange may be screwed into the coil spring, the lip abutting against the end of the spring. The lip 60 also determines the position of the bearing portions of the arms 58 and 59 so that they will be in alignment with each other, the arms being of polygonal cross section. The arms 58 and 59 of polygonal cross section are disposed in seats formed by the bifurcated upper end of the upright 44 and by a groove in the side bar 50 of the back rest frame 48.

In order to provide a finished appearance to the seat construction, the uprights or towers 44 together with their associated mechanisms are enclosed. The cross bar 51 lies in a vertical plane substantially to the rear of the general vertical plane of the side bars 49 and 50. A sheet 48a of fiber board, metal or like substantially rigid material, is fastened at one end thereof to the cross bar 51, the other end being secured to a substantially U-shaped bracket 48b extending laterally of the back rest frame and being secured to the side bars thereof. The sheet 48a extends from side bar 49 to side bar 50 at the rear of the back rest frame and forms a housing for the uprights and associated mechanism.

A resilient pad 61 is disposed on the yielding strips 43 and extends a substantial distance forwardly of the yielding strips to overhang or extend beyond the confines of the base 36. A peripheral groove 62 is provided in the resilient pad along the front edge thereof, and selectively along the side edges of the pad if desired, to receive a frame in the form of a wire 63 which extends from the side bars 49 and 50 forwardly thereof. The wire 63 is supported in position by the resilient pad 61 and, in turn, the pad at the edges thereof is prevented from unduly collapsing when the trim or covering 64 is pulled thereover.

The covering 64 may be of any desired material such as leather, fabric, or the like, and extends over the pad 61 and downwardly over the side edges to be fixed to the base 36. Where elements extend from the base above the upper level of the resilient pad such, for example, as the towers 44, the covering is provided with openings so that these members may extend therethrough. The entire seat is thus trimmed in solid except where the seat and back connection is made. Thus the covering 64 provides air binding to act as a cushion to slow down the vertical movement of the seat. The required amount of air escape may be determined by employing, if necessary, suitable apertures for the escape of the air in such an amount as will cushion the shock to any satisfactory degree.

It has been pointed out above that one of the primary objects of the invention is to provide a construction and arrangement of elements such as will afford a comparatively inexpensive assembly, standardization of parts, and flexibility to dimensional changes. It is necessary in some instances of installation that the seat base must clear obstructions such as gas filler pipes when the gas tank is under the seat of the vehicle. In such an instance it may be necessary to cut a portion of the base at the corner thereof where, in previously described modifications, the upright has been positioned. The present modification permits a greater flexibility in the location of the upright than in the constructions of the modifications previously described in a manner which will hereinafter be more apparent from the following description.

An upright 65 of substantial I-beam cross section is provided with a plurality of apertures 66, 66a and 66b in a spaced superposed relation in the web thereof, through a selected one, of which one end of a plate 67 may extend. Such a tower is disposed adjacent the end of a base 68 at each side thereof. While the drawings disclose but one side edge of the base for supporting a single upright, it is to be understood that a similar upright is disposed along the other side edge at a position such as might be necessitated by the contour of the base.

For the purpose of clearing an obstruction, the base 68 is cut away as at 69 so that the upright 65 is spaced a substantial distance from the normal plane of the side edge of the seat. The plate 67, however, in extending through one of the apertures in the web of the upright 65 may support a yielding strip 70 at the edge of the seat construction in the same manner as that described in the previous modifications, even though the upright is not disposed immediately adjacent the edge of the base.

A plate 71 at the front edge of the base is supported by a bracket 72 similar to the bracket 38 described in Fig. 5, the complementary plates 67 and 71 supporting a plurality of spaced resilient strips 70. The provision of superposed spaced apertures in the web of the upright 65 permits adjustability of the seat height and also permits extension of the plate for supporting the resilient strips in a desired relation. In the present modification, therefore, a substantial flexibility is provided with standardized parts to meet varying dimensions usual in seat requirements, and particularly with reference to such as are necessary to overcome obstructions which may be present in some instances.

The spaced uprights 65, one at each side edge of the base, are tied together at the top end thereof by a bar 73, the bar being provided with a plurality of apertures 74 for selectively engaging a pin 75 extending from the top surface of the upright. A U-shaped member 76 is secured to the bar 73 at each of its outer ends for mounting a rocker spring assembly such, for example, as that shown in Fig. 8 of the drawings, the arm 77 corresponding to the arm 58 thereof. The bar 73 serves not only to support the rocker spring assembly but also to provide greater rigidity in the assembly.

Referring now more particularly to Figs. 13 to 15, inclusive, the resilient connecting member shown therein is a modification of the resilient connecting means shown in Figs. 6 and 7 of the drawings. In the present modification, a cross bar 78 of the back rest frame, the frame being resiliently held against rearward movement by the rocker spring assembly pivotally secured to the U-shaped member 76, extends below the yielding strips and is connected to a convolution 79 of a yielding strip by means of a connection 80. While this member may be formed of various materials, for purposes of illustration the base is shown and is described as being of molded rubber although, of course, any resilient material may be substituted therefor. The main body portion of the molded rubber piece is provided with a central longitudinally extending aperture for snugly engaging the cross bar 78, the main body portion having a substantially V-shaped longitudinally extending portion 81 formed with a pocket 82 for receiving in snug engagement therewith a convolution of the yielding strip. A connection of the type just described may preferably be employed for each yielding strip for securing a convolution thereof to the cross bar at a point where the yielding strip passes over the cross bar.

While several embodiments of this invention are herein shown and described, it is to be understood that various modifications thereof may be apparent to those skilled in the art without departing from the spirit and scope of this invention and, therefore, the same is only to be limited by the scope of the prior art and the appended

I claim:

1. In a device of the character described, a base, a plurality of spaced detachable rigid supports on each end of said base, said supports on one end of said base extending upwardly therefrom and outwardly beyond the confines thereof, transversely extending plates on the upper ends of said supports, securing means selectively positioned on said plates in fixed relation thereto, a plurality of yielding strips for resisting a vertically disposed weight extending substantially horizontally and having the ends thereof fixed to said securing means, a substantially vertically extending back rest frame supported by said yielding strips intermediate the ends thereof for vertical movement therewith, an upright fixed to said base, and means supported between said upright and said back rest frame for resisting rearward movement of said back rest frame and for permitting vertical movement thereof with respect to said base responsive to the movement of said yielding strips.

2. In a device of the character described, a base, a plurality of spaced detachable rigid supports on each end of said base, said supports on one end of said base extending upwardly therefrom and outwardly beyond the confines thereof, transversely extending plates on the upper ends of said supports, clips selectively positioned on said plates in fixed relation thereto, a plurality of yielding strips for resisting a vertically disposed weight extending substantially horizontally and having the ends thereof fixed to said clips, a substantially vertically extending back rest frame supported by said yielding strips intermediate the ends thereof for vertical movement therewith, an upright fixed to said base, and means supported between said upright and said back rest frame for resisting rearward movement of said back rest frame and for permitting vertical movement thereof with respect to said base responsive to the movement of said yielding strips.

3. In a device of the character described, a base, a plurality of spaced detachable rigid supports for selective positioning on each end of said base in fixed relation therewith, a plate for each end of said base carried by said rigid supports, means on said supports adapted to secure plates of varying sizes and shapes thereto, clips selectively positioned on said plates in fixed relation therewith, a plurality of yielding strips for resisting a vertically disposed weight extending substantially horizontally and having the ends thereof fixed to said clips, a substantially vertically extending back rest frame supported by said yielding strips intermediate the ends thereof for vertical movement therewith, an upright fixed to said base, and means supported between said upright and said back rest frame for resisting rearward movement of said back rest frame and for permitting vertical movement thereof with respect to said fixed support responsive to the movement of said yielding strips.

4. In a device of the character described, a wood base, a plurality of spaced rigid supports, a plate for each end of said base carried by said supports, said supports being secured to said base and arranged thereon to conform to a desired selected positioning of said plates with respect to said base, clips selectively positioned on said plates in fixed relation thereto, a plurality of yielding strips for resisting a vertically disposed weight extending substantially horizontally and having the ends thereof fixed to said clips, a substantially vertically extending back rest frame supported by said yielding strips intermediate the ends thereof for vertical movement therewith, an upright fixed to said base, and means supported between said upright and said back rest frame for resisting rearward movement of said back rest frame and for permitting vertical movement thereof with respect to said fixed support responsive to the movement of said yielding strips.

5. In a device of the character described, a rigid support, resilient means for resisting a vertically disposed weight extending substantially horizontally and being fixed to said rigid support, a substantially vertically extending back rest frame supported by said resilient means for vertical movement therewith, an upright fixed to said rigid support, said back rest frame being disposed closely adjacent said upright and comprising side bars connected by a cross bar, said cross bar extending transversely of and below said resilient means and being connected thereto on a line substantially forwardly of said upright, and means supported between said upright and said back rest frame for resisting rearward movement of said back rest frame and for permitting vertical movement thereof with respect to said fixed support responsive to the movement of said yielding strips.

6. In a device of the character described, a rigid support, a plurality of yielding strips for resisting a vertically disposed weight extending substantially horizontally and having the ends thereof fixed to said rigid support, a substantially vertically extending back rest frame supported by said yielding strips for vertical movement therewith, an upright fixed to said rigid support, said back rest frame comprising side bars connected by a cross bar, said side bars being disposed closely adjacent to said upright, said cross bar extending forwardly in a direction away from said upright and transversely of said yielding strips for connection with said yielding strips on a line substantially distant from said upright, and means supported between said upright and said back rest frame for resisting rearward movement of said back rest frame and for permitting vertical movement thereof with respect to said fixed support responsive to the movement of said yielding strips.

7. In a device of the character described, a rigid support, a plurality of yielding strips for resisting a vertically disposed weight extending substantially horizontally and having the ends thereof fixed to said rigid support, a substantially vertically extending back rest frame supported by said yielding strips for vertical movement therewith, an upright fixed to said rigid support, said back rest frame comprising side bars connected by a cross bar, said side bars being disposed adjacent the rear ends of said resilient strips and said cross bar extending forwardly of said side bars and transversely of and below said yielding strips for connection therewith on a line substantially distant from the fixed ends of said resilient strips, and means supported between said upright and said back rest frame for resisting rearward movement of said back rest frame and for permitting vertical movement thereof with respect to said fixed support responsive to the movement of said yielding strips.

8. In a device of the character described, a rigid support, a plurality of yielding strips for resisting a vertically disposed weight extending substantially horizontally and having the ends thereof fixed to said rigid support, a substantially vertically extending back rest frame supported by said yielding strips for vertical movement therewith, an upright fixed to said rigid support, said back rest frame comprising side bars connected by a cross bar, said cross bar extending below said yielding strips, a connection for each of a plurality of said strips secured thereto and to said cross bar, and means supported between said upright and said back rest frame for resisting rearward movement of said back rest frame and for permitting vertical movement thereof with respect to said fixed support responsive to the movement of said yielding strips.

9. In a device of the character described, a rigid support, a plurality of yielding strips for resisting a vertically disposed weight extending substantially horizontally and having the ends thereof fixed to said rigid support, a substantially vertically extending back rest frame supported by said yielding strips for vertical movement therewith, an upright fixed to said rigid support, said back rest frame comprising side bars connected by a cross bar, said cross bar extending below said yielding strips, a U-shaped clip providing a saddle at an intermediate portion for engaging said cross bar, the open ends of said clip engaging said yielding strip, and means supported between said upright and said back rest frame for resisting rearward movement of said back rest frame and for permitting vertical movement thereof with respect to said fixed support responsive to the movement of said yielding strips.

10. In a device of the character described, a rigid support, a plurality of yielding strips for resisting a vertically disposed weight extending substantially horizontally and having the ends thereof fixed to said rigid support, a substantially vertically extending back rest frame supported by said yielding strips for vertical movement therewith, an upright fixed to said rigid support, said back rest frame comprising side bars connected by a cross bar, said cross bar extending below said yielding strips, a U-shaped clip providing a saddle at an intermediate portion, cushioning means in said saddle for enclosing a yielding strip for the support thereof by said clip, the open ends of said clip being secured to said cross bar, and means supported between said upright and said back rest frame for resisting rearward movement of said back rest frame and for permitting vertical movement thereof with respect to said fixed support responsive to the movement of said yielding strips.

11. In a device of the character described, a rigid support, a plurality of yielding strips for resisting a vertically disposed weight extending substantially horizontally and having the ends thereof fixed to said rigid support, a substantially vertically extending back rest frame supported by said yielding strips for vertical movement therewith, an upright fixed to said rigid support, said back rest frame comprising side bars connected by a cross bar, said cross bar extending below said yielding strips, a U-shaped clip providing a saddle at an intermediate portion for engaging said cross bar, a resilient insert extending between and having the ends thereof overlying opposed portions of said yielding strip, the open ends of said clip being hooked over said overlying portion of said resilient insert for connecting said cross bar and said yielding strip, and means supported between said upright and said back rest frame for resisting rearward movement of said back rest frame and for permitting vertical movement thereof with respect to said fixed support responsive to the movement of said yielding strips.

12. In a device of the character described, a base, a rigid support at one end of said base, a plurality of yielding strips for resisting a vertically disposed weight extending substantially horizontally and having one of each of the ends thereof fixed to said rigid support, a substantially vertically extending back rest frame supported by said yielding strips intermediate the ends thereof for vertical movement therewith, an upright fixed to said rigid support, a plate adjustably secured to said upright for supporting the other of each of the ends of said yielding strips, and means supported between said upright and said back rest frame for resisting rearward movement of said back rest frame and for permitting vertical movement thereof with respect to said fixed support responsive to the movement of said yielding strips.

13. In a device of the character described, a base, a rigid support at one end of said base, a plurality of yielding strips for resisting a vertically disposed weight extending substantially horizontally and having one of each of the ends thereof fixed to said rigid support, a substantially vertically extending back rest frame supported by said yielding strips intermediate the ends thereof for vertical movement therewith, an upright fixed to said rigid support, said upright having a plurality of spaced superposed apertures therethrough, a plate selectively disposed in one of said apertures to extend on each side thereof for supporting the other of each of the ends of said yielding strips, and means supported between said upright and said back rest frame for resisting rearward movement of said back rest frame and for permitting vertical movement thereof with respect to said fixed support responsive to the movement of said yielding strips.

14. In a device of the character described, a rigid support, a plurality of yielding strips having continuous undulations for resisting a vertically disposed weight extending substantially horizontally and having the ends thereof fixed to said rigid support, a substantially vertically extending back rest frame supported by said yielding strips for vertical movement therewith, an upright fixed to said rigid support, said back rest frame comprising side bars connected by a cross bar, said cross bar extending below said yielding strips, a flexible connection for each of a plurality of said strips, said connections each having an aperture for receiving said cross bar and a pocket for receiving an undulation of said yielding strips for securing said yielding strips to said cross bar, and means supported between said upright and said back rest frame for resisting rearward movement of said back rest frame and for permitting vertical movement thereof with respect to said fixed support responsive to the movement of said yielding strips.

15. The combination with a seat construction comprising a support, resilient means for resisting a vertically disposed weight, a substantially vertically extending back rest frame supported by said resilient means for vertical movement therewith, and a pair of uprights adjacent said back rest frame, of means supported between said uprights and said back rest frame for resisting rearward movement of said back rest frame and for permitting vertical movement thereof with respect to said fixed support responsive to the movement of said resilient means, said means comprising an arm pivotally connected to each of said uprights and said back rest frame, a spiral ramp flange on each of the free ends of said arms, and a coil spring disposed between said flanges with the end convolutions thereof screwed on said flanges.

16. The combination with a seat construction comprising a support, resilient means for resisting a vertically disposed weight, a substantially vertically extending back rest frame supported by said resilient means for vertical movement therewith, and a pair of uprights adjacent said back rest frame, of means supported between said uprights and said back rest frame for resisting rearward movement of said back rest frame and for permitting vertical movement thereof with respect to said fixed support responsive to the movement of said resilient means, said means comprising an arm of polygonal cross section pivotally connected within apertures in said uprights and said back rest frame to prevent rotary movement thereof, a spiral ramp flange on each of the free ends of said arms, said flange having a lip at the end of the ramp extending angularly thereto, and a coil spring disposed between said flanges with the end convolutions thereof screwed on said flanges to an amount predetermined by the lips of the flanges.

17. In a device of the character described, a rigid support, resilient means for resisting a vertically disposed weight and being fixed to said rigid support, a substantially vertically extending back rest frame supported by said resilient means for vertical movement therewith, said back rest frame having a cross bar adjacent the lower end thereof projecting forwardly of the remainder of the frame, said cross bar extending transversely of and below the supporting surfaces of said resilient means and being connected thereto, a fixedly mounted upright, and means supported between said upright and said back rest frame for resisting rearward movement of said back rest frame and for permitting vertical movement thereof with respect to said fixed support responsive to the movement of said resilient means.

18. In a device of the character described, a rigid support, a plurality of yielding strips for resisting a vertically disposed weight extending substantially horizontally and having the ends thereof fixed to said rigid support, a substantially vertically extending back rest frame supported by said yielding strips for vertical movement therewith, said back rest frame having a cross bar at the lower end thereof projecting forwardly of the remainder of the frame, said cross bar extending transversely of and below said yielding strips for connection therewith on a line substantially distant from the fixed ends of said resilient strips, a fixedly mounted upright adjacent said back rest frame, and means supported between said upright and said back rest frame for resisting rearward movement of said back rest frame and for permitting vertical movement thereof with respect to said fixed support responsive to the movement of said yielding strips.

HYLAND C. FLINT.